Figure 1:
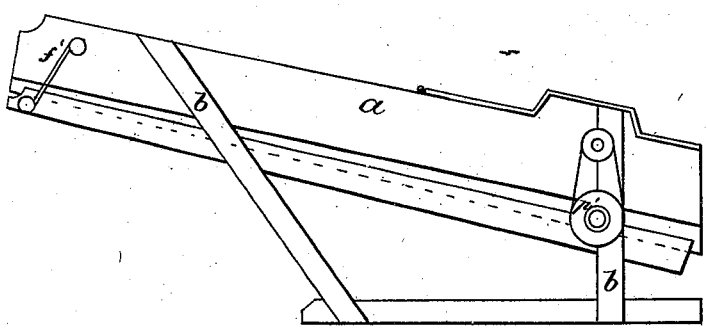

W. PIERPONT.
Straw-Carrier.

No. 227,649.                    Patented May 18, 1880.

Witnesses:
N. Wiand
A. Scott

Inventor:
Wm Pierpont
by J. J. Greenough
Atty

UNITED STATES PATENT OFFICE.

WILLIAM PIERPONT, OF SALEM, NEW JERSEY.

STRAW-CARRIER.

SPECIFICATION forming part of Letters Patent No. 227,649, dated May 18, 1880.

Application filed September 16, 1879.

*To all whom it may concern:*

Be it known that I, WILLIAM PIERPONT, of Salem, New Jersey, have invented certain Improvements in Straw-Carriers and Seed-Separators Connected with Thrashing-Machines and Chaffers, of which the following is a specification.

My present improvement is based upon my former inventions, for which I obtained Letters Patent May 7, 1850, No. 7,349, and December 24, 1861, No. 34,010, and is intended to obviate the objections found to exist therein.

The following is a description of my new devices and their application, referring to the drawings, in which—

Figure 2:
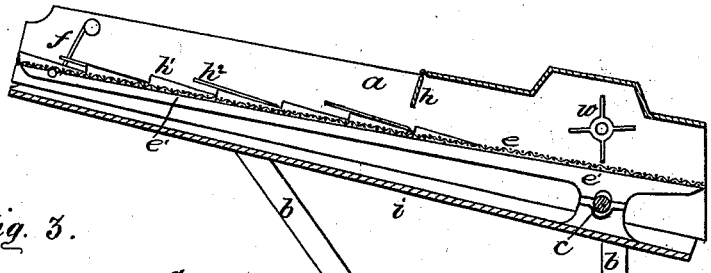
Figure 3:
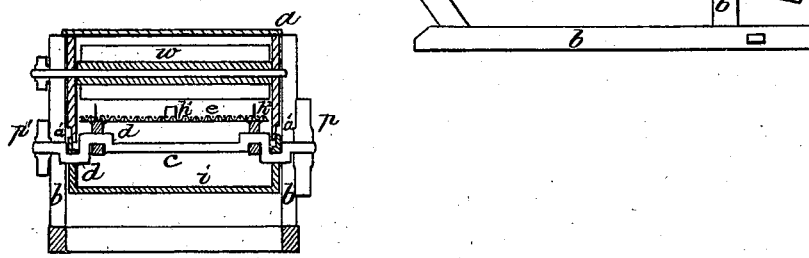

Figure 1 is a side elevation. Fig. 2 is a vertical longitudinal section. Fig. 3 is a cross-section at the shaft $c$.

The frame is composed of permanent side pieces, $a$, supported at a proper inclination by legs and sill $b$, Fig. 1. This frame may be of any width and height suited to the thrasher at its lower end, its upper end being sufficiently elevated to properly discharge the straw. A shaft, $c$, is placed across the frame, having its bearings near the lower end thereof. This shaft $c$ has a sunk double crank near each side of the frame, at $d$, that sustain and give motion to the separator and seed-carrier apron. There is a driving-pulley, $p$, on one end of this shaft, outside the frame, and a pulley, $p'$, on its opposite end. This is connected by a band with a pulley above on the shaft of fan-wheel $w$, which fan is capped over by a stationary cover affixed to the sides of the frame, $a$. A guard-board, $h$, is hinged to the upper end of this cover, as in my former patent, and for the same purpose. The fan $w$, by its blast, serves, in combination with the upward blast, hereinafter described, to even the straw on the separator before passing the guard-board $h$.

Between the stationary side pieces, $a$, of the frame I suspend a perforated separator and straw-carrier, $e$, that extends from end to end of the frame, and as broad as the space between the sides $a$. It is composed, as seen in the drawings, of two side bars, $e'$, on which a perforated screen of any suitable material is affixed, through which the grain shaken from the straw can pass. Its upper end is supported by suspending-rods $f$, jointed to a cross-shaft below, that extends from side to side through the bars $e'$. The upper ends of these suspending-rods $f$ are attached to the sides $a$ of the frame. The lower end of the separator $e$ is supported by the crank-shaft $c$, a wrist of each of the sunk cranks $d$ having a bearing in one of the bars $e'$, to which they give motion by their revolution, and cause this end of the separator to rise and fall and move longitudinally forward and back, by which action the straw is carried up the inclined plane, aided by the action of a series of inclined teeth, $h^2$, affixed in the bars $e'$, that have an inclination in the direction of the outgoing straw, and a notched bar, $h'$, is placed lengthwise at the center to assist this movement.

Below the separator $e$ a close apron or seed-carrier, $i$, is located, of equal length with the separator $e$. Its bottom is made tight, with its sides overlapping the lower edges of the sides $a$ of the stationary frame above, that are rabbeted out, as seen at $a'$, Fig. 3, to receive them. This apron $i$ is suspended at its upper end by rods $f'$ outside, (see Fig. 1,) and its lower end is suspended on the wrist of sunk crank $d$, on the side of the shaft opposite that on which shaker $e'$ rests, so that the movement of the two will at all times be the reverse of each other, one counterbalancing the other without the addition of a counter-weight. These movements of the separator and seed-apron $i$ produce a new and beneficial effect upon the straw by forcing a blast of air up through it at each revolution, and thus loosening it up and giving the grain a better chance to shake through, while the straw thus moved makes a livelier exit than by my former devices and by the combined action of the two blasts it is evened and spread upon the separator.

By this construction I produce a lighter-running and more efficient separator and straw-carrier than any I have heretofore known.

Having thus fully described my improved separator and straw-carrier, what I claim is—

1. The combination of the vertically-vibrating separator $e$ and seed-carrier $i$, so hung and supported upon the cranks of the shaft $c$ as to counterbalance each other, and operating substantially as and for the purposes herein specified.

2. The combination of the fan $w$ and seed-carrier apron $i$, for producing blasts on opposite sides of the screen $e$, and in opposite directions, to even and spread the straw, as and for the purposes specified.

WILLIAM PIERPONT.

Witnesses:
JOSEPH H. FOGG,
WALTER W. ACTON.